Jan. 1, 1935. O. GERLINE 1,985,985
FISH POLE HOLDER
Filed Oct. 27, 1933 2 Sheets-Sheet 1
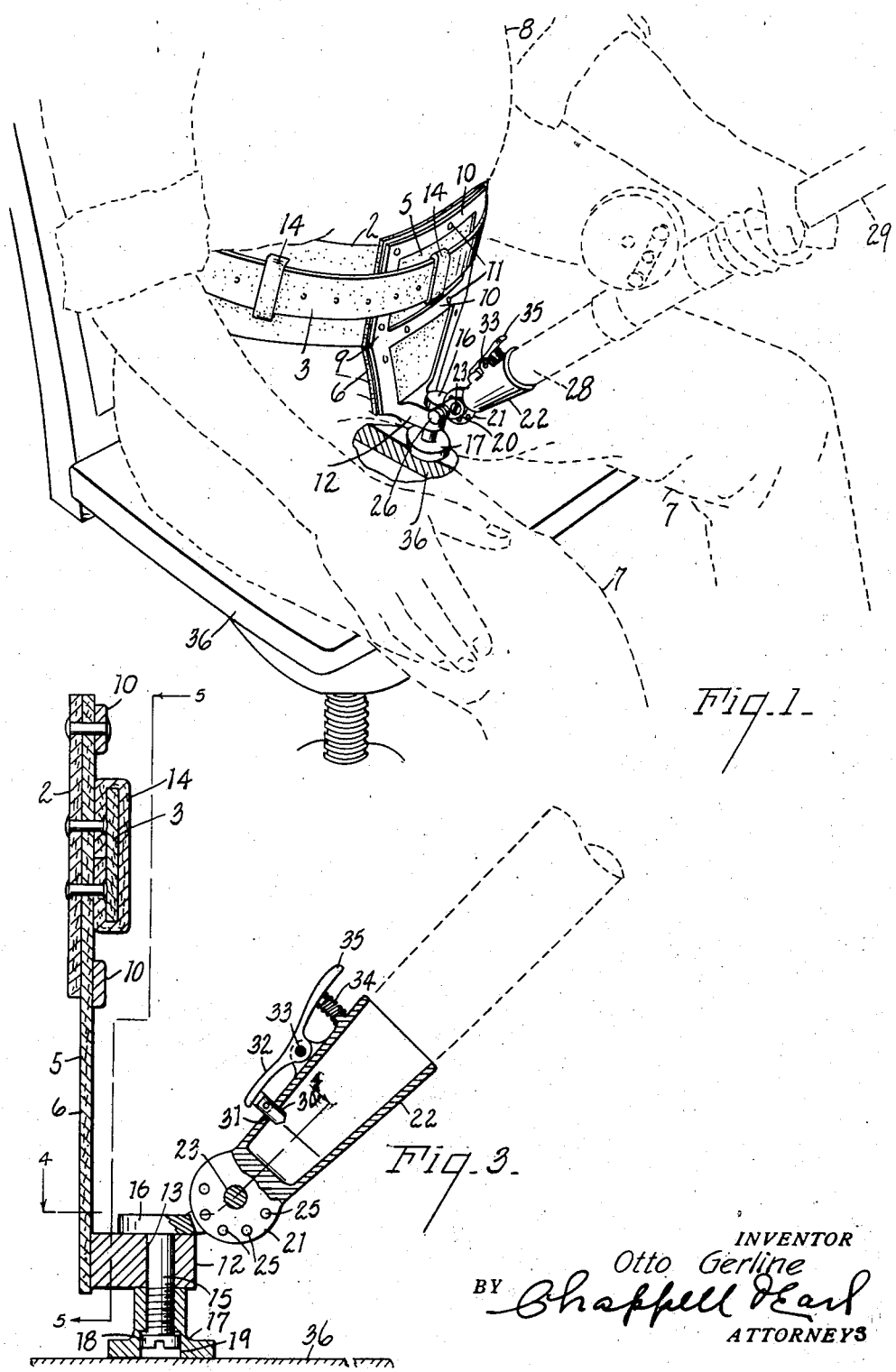
INVENTOR
Otto Gerline
BY Chappell Earl
ATTORNEYS

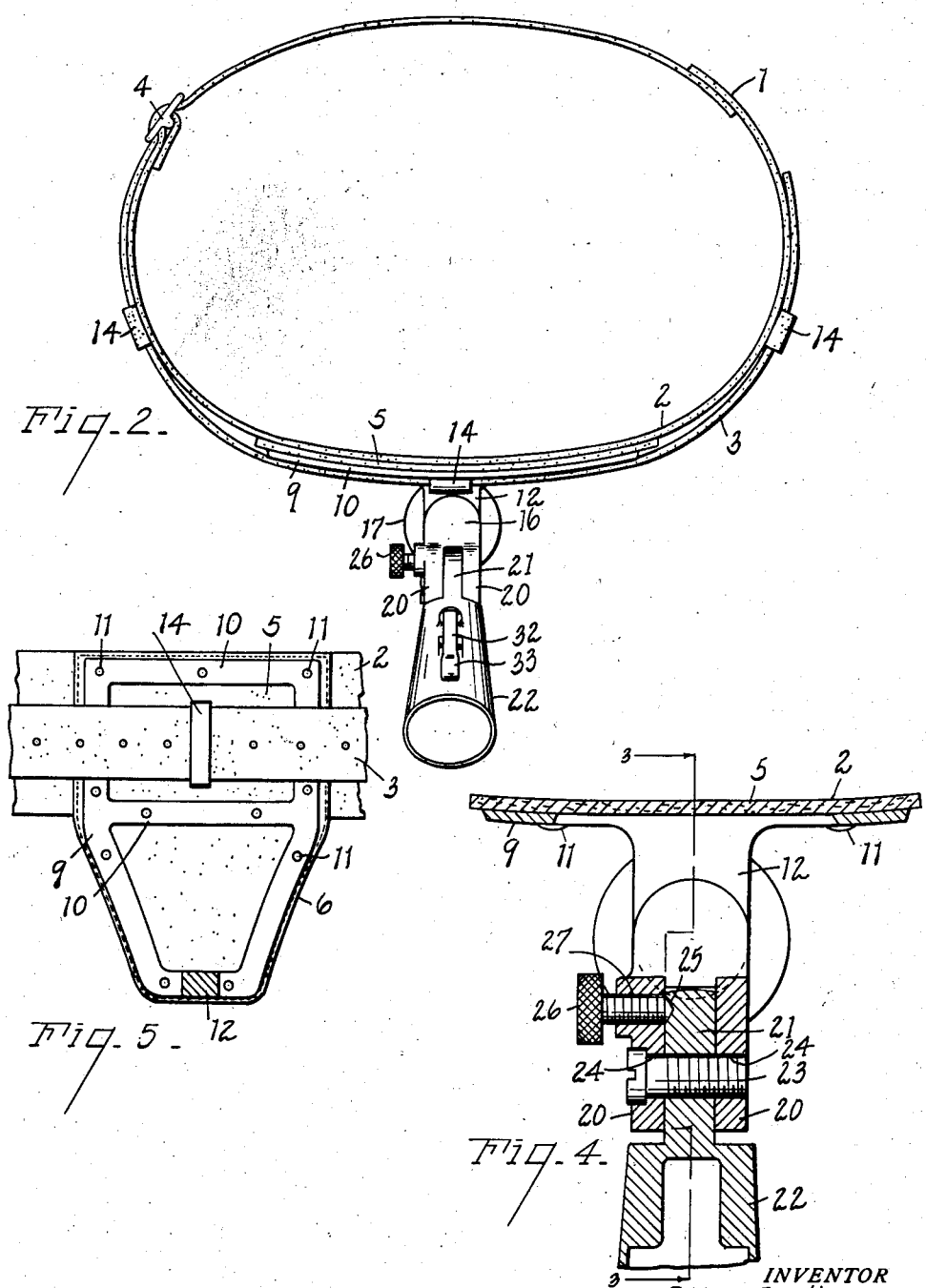

Patented Jan. 1, 1935

1,985,985

UNITED STATES PATENT OFFICE 1,985,985

FISH POLE HOLDER

Otto Gerline, Kalamazoo, Mich.

Application October 27, 1933, Serial No. 695,414

15 Claims. (Cl. 224—5)

This application is a continuation in part of my copending application, Ser. No. 641,345, filed November 5, 1932, for fishing rod support.

The main objects of this invention are:

First, to provide a body attached fish pole holder or support comprising a belt and a front plate covering a substantial portion of the abdomen and in which the pole is positioned so that the arms of the user are not cramped but are in position to exert maximum strength without undue fatigue.

Second, to provide a fish pole holder in which the load when the user is sitting is supported largely by the seat, and at the same time the user may move about freely as desired or leave the seat without changing his grasp on the pole.

Third, to provide a fish pole holder permitting the pole to be swung about horizontal and vertical axes and having means for securing the same against movement as desired.

Fourth, to provide a fish pole holder of this character which is strong and durable, highly practical and very easy on the user, allowing the latter to play a large fish for many hours without undue fatigue.

Objects relating to details and economies of my invention will appear from the description to follow. The invention is defined and pointed out in the claims.

A structure which is a preferred embodiment of my invention is illustrated in the accompanying drawings, in which:

Fig. 1 is a perspective view of a fish pole holder embodying the features of my invention in use, the pole and user being indicated in dotted outline.

Fig. 2 is a top plan view.

Fig. 3 is an enlarged vertical section on line 3—3 of Fig. 4.

Fig. 4 is a detail section on line 4—4 of Fig. 3.

Fig. 5 is a view partially in front elevation and partially in section on a line corresponding to line 5—5 of Fig. 3.

In the commercial embodiment of my invention illustrated in the drawings numeral 1 is a leather belt having a relatively wide front portion 2 and a flexible strap portion 3 for coaction with the belt buckle 4. A leather panel 5 is sewed to the front portion 2 and has a depending V-flap 6 adapted to extend between the legs 7, 7 of the user 8 when sitting. A skeletonized metal frame 9 having curved cross members 10 is riveted to the front of the panel at 11, the outline of the frame following that of the panel as illustrated. At its lower end, the frame is provided with a forwardly extending integral bracket 12 having a vertical bearing 13. The belt is provided with a series of loop-like keepers 14 for the strap 3, one of the keepers being located within the frame 9.

The spindle 15 is disposed in the vertical bearing 13 and has an enlarged upper end or head portion 16 resting on the top of the bearing member. A thumb nut 17 is threaded to the lower end of the spindle for coaction with the bottom of the bearing member to clamp the spindle in a desired adjusted position relative to the bracket or to retain it for free pivotal movement. The lower end of the spindle is provided with a screw 18 which acts to retain the nut on the spindle, the nut being provided with a counterbore 19 for receiving the head of the screw.

The head 16 of the spindle is provided with upwardly and forwardly projecting ears 20, 20 which are arranged in spaced relation for receiving the flattened rear end portion or pivot ear 21 of the socket member 22. The latter is pivoted to the ears 20 by the pivot 23 threaded in the opposed openings 24, 24 of the ears 20.

The pivot ear 21 of the socket member is provided with circumferentially spaced keeper recesses 25 on one side thereof for coaction with the set screw 26 which is threaded to an opening 27 provided therefor in one of the arms. With the parts thus arranged the socket member may be secured in adjusted position by bringing one of the recesses in registry with the set screw and tightening the latter. The recesses 25 are preferably arranged so that the socket member may be locked in an upright or a horizontal or a downwardly extending position and positions intermediate thereof.

The butt 28 of the fish pole 29 is secured in position by the detent 30 slidably disposed in the radial opening 31 of the wall of the socket member 22. The detent is pivotally carried by the inner end of the lever 32 which is pivoted to the socket member at 33 and is resiliently urged to rocking position by the compression spring 34. The lever has a finger piece 35 for swinging it against the force of the spring to release the detent from engagement with its socket in the pole butt, thereby permitting the latter to be quickly released from the socket member.

In Fig. 1 I have illustrated my improved pole holder in operative relation on a person seated. It will be noted that the depending portion of the abdominal plate depends between the legs of the wearer so that the nut, which is the lowermost portion of the device, rests upon the seat of the chair which is indicated at 36. This relieves the user of a considerable part of the load and prevents the belt cutting into the legs of the wearer when under load and stress such as occurs in the landing of a large fish. At the same time the user is free to shift his position or to stand if desired, and when standing the load is well distributed on the body of the wearer.

A further advantage is that the pole holder mounting, being low down relative to the body of the wearer, the arms are in a natural position when manipulating a fish. This is much less tiring than when the pole holder is mounted or supported at the waist line.

When the thumb nut 17 is released the pole holder is free to swing on the spindle or the nut may be quickly adjusted to clamp the spindle in a selected position. The set screw 26 may also be adjusted to allow free pivotal movement of the holder on its pivot or to secure it in a selected position, thereby further minimizing the labor of the operator. The screw 26 may be quickly released in the event of a strike so that the user may play the fish as desired and with a minimum of effort. The pole may be quickly detached should occasion require.

As stated, the user is free to move about and at the same time when sitting the load is minimized. The device may be successfully used in various forms of fishing such as deep sea and surf fishing, or trolling.

I have illustrated and described my improvements in an embodiment which I have found very practical. I have not attempted to illustrate or describe other embodiments or adaptations as it is believed this disclosure will enable those skilled in the art to embody or adapt my improvements as may be desired.

Having thus described my invention what I claim as new and desire to secure by Letters Patent is:

1. A fish pole holder comprising a belt having an abdominal plate with an extension depending between the legs of the user when the belt is placed about the body and the user is seated and having a forwardly projecting spindle bracket at its lower end, a spindle disposed vertically in said bracket and having a head resting thereon and provided with forwardly offset pivot ears, a thumb nut threaded to the lower end of said spindle for clamping it in adjusted positions on said bracket or retaining it for free pivotal movement thereon, said thumb nut being adapted to rest on the seat of the chair occupied by the user, a pole socket having a pivot ear pivoted between said pivot ears on said spindle head for vertical swinging movement, the pivot ear on said pole socket having a plurality of spaced keeper recesses in the sides thereof, and a set screw threaded into one of said pivot ears on said spindle to be selectively engaged in said keeper recesses for locking the pole socket in its adjusted position on its pivot.

2. A fish pole holder comprising a belt having an abdominal plate with an extension depending between the legs of the user when the belt is placed about the body and the user is seated and having a forwardly projecting spindle bracket at its lower end, a spindle disposed vertically in said bracket and having a head resting thereon and provided with forwardly offset ears, and a pole socket having a pivot ear pivoted between said pivot ears on said spindle head for vertical swinging movement, the bracket-spindle joint being so located that it is supported by the seat when in use.

3. A fish pole holder comprising a belt having an abdominal plate with a forwardly projecting spindle bracket at its lower end, a spindle disposed vertically in said bracket and having a head resting thereon and provided with forwardly offset pivot ears, a thumb nut threaded to the lower end of said spindle for clamping it in adjusted positions on said bracket or retaining it for free pivotal movement thereon, said thumb nut being adapted to rest on the seat of the chair occupied by the user, a pole socket having a pivot ear pivoted between said pivot ears on said spindle head for vertical swinging movement, the pivot ear on said pole socket having a plurality of spaced keeper recesses in the sides thereof, and a set screw threaded into one of said pivot ears on said spindle to be selectively engaged in said keeper recesses for locking the pole socket in its adjusted position on its pivot.

4. A fish pole holder comprising a belt having an abdominal plate with a forwardly projecting spindle bracket at its lower end which projects between the legs of the user when the belt is in place on the body and the user is seated, a spindle disposed vertically in said bracket and having a head resting thereon and provided with forwardly offset pivot ears, and a pole socket having a pivot ear pivoted between said pivot ears on said spindle head for vertical swinging movement.

5. A fish pole holder comprising a belt having an abdominal plate with an extension depending between the legs of the user when the belt is placed about the body and the user is seated and having a forwardly projecting spindle bracket at its lower end, a spindle disposed vertically in said bracket, a thumb nut threaded to the lower end of said spindle for clamping it in its adjusted positions on said bracket or retaining it for free pivotal movement thereon, said thumb nut being adapted to rest on the seat of the chair occupied by the user, a pole socket pivoted on said spindle for vertical swinging movement, and means for securing the pole socket in its adjusted position on its pivot.

6. A fish pole holder comprising a belt having an abdominal plate with a forwardly projecting spindle bracket at its lower end, a spindle disposed vertically in said bracket, a thumb nut threaded to the lower end of said spindle for clamping it in its adjusted positions on said bracket or retaining it for free pivotal movement thereon, said thumb nut being adapted to rest on the seat of the chair occupied by the user, a pole socket pivoted on said spindle for vertical swinging movement, and means for securing the pole socket in its adjusted position on its pivot.

7. A fish pole holder comprising a belt having an abdominal plate provided with a portion depending between the legs of the user when the belt is placed about the body and the user is seated, a vertically disposed spindle on said plate, means for securing said spindle in its adjusted positions, said means being adapted to rest on the seat of the chair occupied by the user, a pole socket pivoted on said spindle for vertical swinging movement, and means for securing said pole socket in one of a plurality of selected positions.

8. A fish pole holder comprising a belt having an abdominal plate provided with a portion depending between the legs of the user when the belt is placed about the body and the user is seated, a vertically disposed spindle on said plate, and a pole socket pivoted on said spindle for vertical swinging movement, the plate-spindle joint being so located that it is supported by the seat when in use.

9. A fish pole holder comprising a belt having an abdominal plate provided with a portion depending between the legs of the user when the belt is placed about the body and the user is seated, a pole holder, a universal joint connection for said pole holder to the lower end of said plate whereby the holder is supported for swinging movement in vertical and horizontal planes, and means for securing the pole holder in a selected position relative to said abdominal plate, the joint being so located that it is supported by the seat when in use.

10. A fish pole holder comprising a belt having an abdominal plate provided with a depending portion having a bracket at its lower end which projects between the legs of the user when the belt is in place on the body and the user is seated, a spindle disposed vertically on said bracket, a pole holder mounted on said spindle for vertical swinging movement, means for securing said spindle against pivotal movement, and means for securing the pole holder against pivotal movement.

11. A fish pole holder comprising a belt having an abdominal plate provided with a portion depending between the legs of the user when the belt is placed about the body and the user is seated, and pole holder means mounted on the depending portion, the pole holder means being so located that it is supported by the seat when in use.

12. A fish pole holder comprising a belt having an abdominal plate provided with a depending portion having a bracket at its lower end which projects between the legs of the user when the belt is in place on the body and the user is seated, a spindle disposed vertically on said bracket, a pole holder mounted on said spindle for vertical swinging movement, means for securing said spindle against pivotal movement, and means for securing the pole holder against pivotal movement.

13. A fish pole holder comprising a belt having a wide front portion, an abdominal plate comprising a leather panel secured to said front portion of said belt and having a depending tapered portion, a metal skeleton frame of a general shape corresponding to that of the panel superimposed thereon and having curved cross members, said frame being riveted to said panel and having a forwardly extending bracket portion at its lower end provided with a vertical bearing, a spindle disposed in said bearing and having a head resting on the top of the bracket, a nut threaded to the lower end of the spindle to retain the same for pivotal movement or to clamp in adjusted positions, a pole supporting means pivotally mounted on the head of the spindle for vertical swinging movement, and means for securing the supporting means in a selected position.

14. A fish pole holder comprising a belt having a wide front portion, an abdominal plate comprising a leather panel secured to said front portion of said belt and having a depending tapered portion, a metal skeleton frame of a general shape corresponding to that of the panel superimposed thereon and having curved cross members, said frame being riveted to said panel and having a forwardly extending bracket portion at its lower end provided with a vertical bearing, a spindle disposed in said bearing and having a head resting on the top of the bracket, and a pole supporting means pivotally mounted on the head of the spindle for vertical swinging movement.

15. A fish pole holder comprising a belt having a wide front portion, an abdominal plate secured to said front portion of said belt and having a depending tapered portion, a skeleton frame of a general shape corresponding to that of the panel superimposed thereon, said frame being fixed to said panel and having a forwardly extending bracket portion at its lower end provided with a vertical bearing, a spindle disposed in said bearing and having a head, and pole supporting means pivotally mounted on the head of the spindle for vertical swinging movement.

OTTO GERLINE.